United States Patent [19]
Koinuma et al.

[11] Patent Number: 5,301,355
[45] Date of Patent: Apr. 5, 1994

[54] MODULATED SIGNAL TRANSMITTING APPARATUS

[75] Inventors: Hiroshi Koinuma; Hiroshi Terashima, both of Tokyo, Japan

[73] Assignee: Pioneer Electronic Corporation, Tokyo, Japan

[21] Appl. No.: 551,355

[22] Filed: Jul. 12, 1990

[30] Foreign Application Priority Data

Jul. 14, 1989 [JP] Japan .................. 1-82246[U]

[51] Int. Cl.$^5$ .................................. H04B 7/15
[52] U.S. Cl. ............................ 455/21; 455/114; 455/306; 359/146
[58] Field of Search ............ 455/20, 21, 84, 114, 455/118, 119, 120, 63, 68, 67, 340, 307, 266, 23, 85, 87, 22, 306, 921, 352; 359/174, 142, 143, 144, 145, 146, 147, 148

[56] References Cited

U.S. PATENT DOCUMENTS

| | | | |
|---|---|---|---|
| 2,406,923 | 6/1942 | Tunick | 455/22 |
| 2,614,211 | 10/1952 | Goodall | 455/21 |
| 4,074,198 | 2/1978 | Furuya | 455/23 |
| 4,221,932 | 9/1980 | Anglikowski et al. | 455/67 |
| 4,339,828 | 7/1982 | Chasek | 455/266 |
| 4,424,593 | 1/1984 | Kamn | 455/63 |
| 4,563,651 | 1/1986 | Omta et al. | 455/266 |

FOREIGN PATENT DOCUMENTS

| | | | |
|---|---|---|---|
| 1909678 | 2/1969 | Fed. Rep. of Germany | 455/23 |
| 0316030 | 12/1989 | Japan | 455/307 |
| 0718888 | 2/1980 | U.S.S.R. | 455/307 |

Primary Examiner—Reinhard J. Eisenzopf
Assistant Examiner—Chi Pham
Attorney, Agent, or Firm—Sughrue, Mion, Zinn, Macpeak & Seas

[57] ABSTRACT

An infrared remote control signal is entered into a receiving circuit where it is converted into an electrical, modulated signal made up of a carrier and a command signal. The modulated input signal is sent to a control signal output circuit where it is filtered to send only the carrier of the remote input signal to a frequency-voltage conversion circuit. The frequency-voltage conversion circuit generates a control DC voltage according to the carrier frequency. The control DC voltage changes the pass band characteristic of a voltage-controlled filter in such a manner that the voltage-controlled filter selectively passes the desired fundamental frequency component and harmonic components of the carrier signal. The voltage-controlled filter also passes the command signal component. Thus, at the output of the voltage-controlled filter is obtained a modulated output signal whose carrier frequency is varied from that of the modulated input signal. With the carrier frequency changed, the resulting infrared remote control signal sent out from a transmitting circuit can be prevented from being affected or interfered with by external noise from fluorescent lamps.

10 Claims, 2 Drawing Sheets

MODULATED SIGNAL TRANSMITTING APPARATUS

BACKGROUND OF THE INVENTION

The present invention relates to a modulated signal transmitting apparatus for receiving modulated signals and sending them out.

A common process of performing remote control on equipment or devices to be controlled involves the following operations. A remote control transmitter modulates a carrier with a command signal and converts the modulated signal by a light-electricity conversion means into an infrared signal, which is transmitted as an infrared remote control signal. The equipment to be controlled receives the infrared remote control signal at the light receiving section, converts it into an electric signal, and demodulates it to recover the command signal. According to the command signal thus recovered, the controlled equipment performs the required control.

When such a remote control system is exposed to intermittent external noise such as from fluorescent lamps, especially when the carrier frequency of the remote control signal is in the same range as the external noise frequency, the remote control signal is interfered with by the noise, with the result that the remote control signal cannot be correctly received by the controlled equipment. The command signal therefore cannot be demodulated and recovered, resulting in an undesired operation of the equipment or failure to operate.

With a view to overcoming the above drawback experienced with conventional transmitters, it is an object of this invention to provide a modulated signal transmitting apparatus which is capable of outputting modulated remote control signals without being affected by external noise.

SUMMARY OF THE INVENTION

A modulated signal transmitting apparatus according to this invention comprises: a control signal output means for receiving a modulated signal which is generated by modulating a carrier signal with a certain command signal, the control signal output means being adapted to output a control signal which corresponds to the frequency of the carrier signal of the modulated signal; and a modulated signal output means for receiving the modulated signal and the control signal; whereby said modulated signal output means outputs a modulated signal whose carrier frequency is regulated by the control signal.

In the above configuration, the modulated input signal is entered into the control signal output means, which outputs a control signal that corresponds to the frequency of carrier of the modulated input signal. The modulated signal output means generates a modulated output signal whose carrier signal has a frequency corresponding to the control signal. That is, the modulated signal output by the modulated signal output means is formed as a signal whose carrier frequency is related to the frequency of the carrier of the modulated input signal. This makes it possible to produce a modulated output signal with a carrier whose frequency is not interfered with by external noise frequency so that the modulated output signal has immunity to noise.

DESCRIPTION OF THE PREFERRED EMBODIMENTS

Preferred embodiments of the invention will be described by referring to the attached drawings.

This embodiment shows an infrared remote control system to control a stereo set in a room A, as a controlled equipment, from another room B. In the room A are installed a remote control signal emitting section and the stereo set comprising an amplifier, a compact disc player, a tuner, speakers and a remote control signal receiving section. In the room B is installed a remote control transmitter as well as speakers and another remote control signal receiving section, which is connected with the remote control signal emitting section in the room A through a control line.

In the above configuration, in order to listen to music in the room B by the stereo set placed in the room A, an infrared command signal should first be transmitted to the remote control signal receiving section in the room B. The remote control signal receiving section converts the infrared command signal to an electric signal to transmit the electric signal to the remote control signal emitting section in the room A through the control line. At the remote control signal emitting section, the electrical signal is converted to another infrared command signal, which is transmitted to the remote control signal receiving section on the stereo set. Accordingly, command signals corresponding to the remote control transmitter is output to the speakers in the room B through a signal line from the stereo set. But, the infrared command signal is occasionally interfered with by external noise such as from fluorescent lamps.

Figure 1:
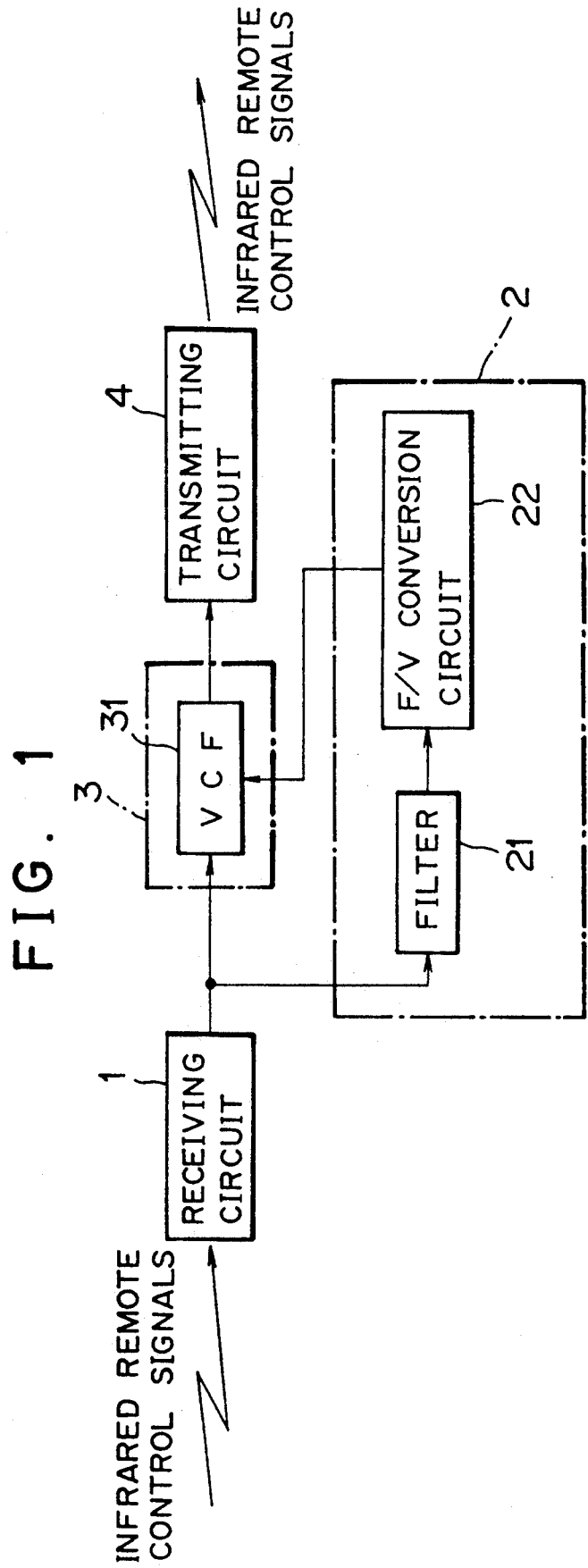
FIGS. 1 and 2 are block diagrams showing modulated signal transmitting apparatuses as embodiments of the invention.
Figure 2:
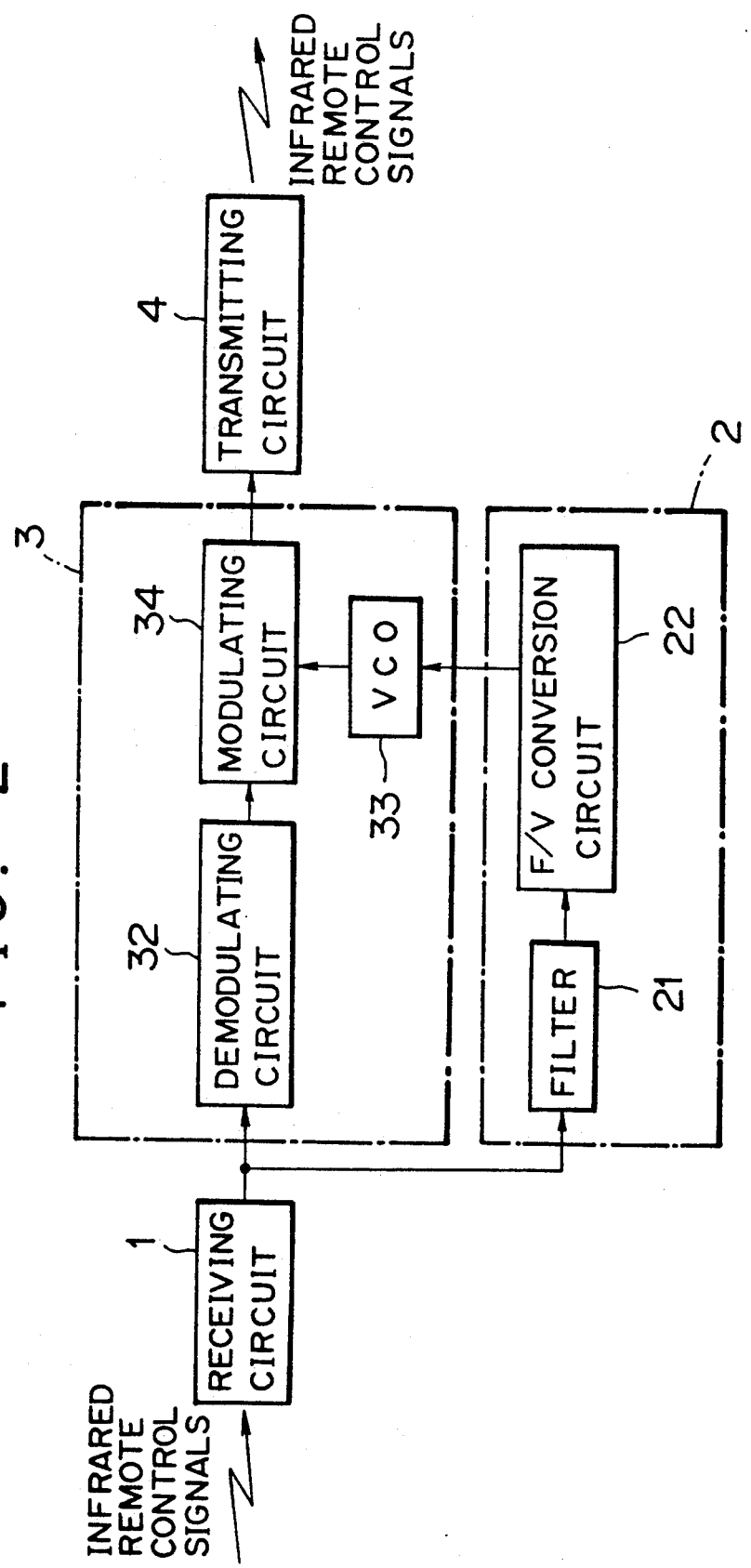

FIGS. 1 and 2 are block diagrams illustrating the embodiments of the modulated signal transmitting apparatus according to this invention.

In FIG. 1, reference numeral 1 represents a receiving circuit that receives infrared remote control signals such as from a remote control transmitter and which converts the infrared remote control signal into an electrical signal and outputs a modulated signal of the remote control signal. 2 stands for a control signal output circuit for inputting the modulated signal and outputting a corresponding control signal. Designated 3 is a modulated signal output circuit which, according to the control signal from the control signal output circuit 2, changes the carrier frequency of the modulated signal and then produces a new modulated signal with the altered carrier frequency. Designated 4 is a transmitting circuit that converts the modulated signal transferred from the modulated signal output circuit 3 into an infrared signal and transmits it as the infrared remote control signal.

The control signal output circuit 2 consists of a filter 21 that passes only the carrier of the modulated signal from the receiving circuit 1; and a frequency-voltage conversion circuit (F/V conversion circuit) 22 for outputting a DC voltage corresponding to the carrier frequency from the filter 21. The DC voltage thus produced is output as a control signal from the control signal output circuit 2. The modulated signal output circuit 3 has a voltage-controlled filter (VC filter) 31 whose pass band characteristic is changed according to the DC voltage and which works as a tuning type filter. The infrared remote control signal and the modulated signal are signals whose carriers are modulated by command signals.

In the above configuration, the infrared control signal is entered into the receiving circuit 1 where it is converted into an electric signal, which is further processed to produce at the output of the receiving circuit 1 a modulated signal that corresponds to the received remote control signal. The filter 21 passes only the carrier component of the remote control signal and transfers it to the F/V conversion circuit 22. The F/V conversion circuit 22 in turn produces a DC voltage corresponding to the carrier frequency that has passed through the filter 21.

The modulated signal from the receiving circuit 1 is also supplied to the VC filter 31, whose pass band characteristic is changed according to the DC voltage from the F/V conversion circuit 22. The carrier of the modulated signal contains, in addition to the fundamental frequency component, even- and odd-numbered orders of harmonic components. The VC filter 31 therefore passes the command signal component and has its pass band characteristic altered so that the fundamental component of the carrier and other harmonic components can be selectively passed through while preventing those components that are affected by external noise from passing through the VC filter. In other words, the VC filter 31 works as a variable tuning type filter for the carrier of the input modulated signal.

At the output of the VC filter 31, therefore, a remote control signal is obtained which has its carrier frequency altered in accordance with the carrier frequency of the input remote control signal. The transmitting circuit 4 converts the modulated signal from the VC filter 31 into an infrared remote control signal and sends it to the controlled equipment.

FIG. 2 shows another embodiment of the invention. In the figure, a modulated signal output circuit 3 includes a demodulating circuit for demodulating the modulated signal from the receiving circuit 1 and outputting the command signal; a voltage-controlled oscillation (VCO) circuit 33 whose oscillation frequency is changed by the DC voltage from the F/V conversion circuit 22; and a modulating circuit 34. In other respects, the second embodiment is similar to the first embodiment.

In this configuration, the modulated signal from the receiving circuit 1 is supplied to the demodulating circuit 32, which demodulates it and outputs the command signal. The VCO circuit 33 produces an oscillation signal whose frequency is controlled by the DC voltage fed from the F/V conversion circuit 22. The modulating circuit 34 uses the oscillation signal from the VCO circuit 33 as a carrier signal and modulates it with the command signal from the demodulating circuit 32. Since the DC voltage of the F/V conversion circuit 22 represents the carrier frequency of the command signal entered into the receiving circuit 1, the oscillated frequency of the VCO circuit 33 varies with the carrier frequency. Thus, at the output of the modulating circuit 34 is produced a modulated signal whose carrier frequency changes with the frequency of the carrier signal of the remote control signal.

In the preceding embodiments, even when the infrared remote control signal applied to the receiving circuit 1 is exposed to intermittently occurring external noise such as from fluorescent lamps, the infrared remote control signal output from the transmitting circuit 4 can be normally received by the controlled equipment where the command signal is correctly demodulated. This is because the carrier signal of the infrared remote control signal output from the transmitting circuit 4 has a frequency which is not easily affected nor interfered with at all by the frequency of such external noise.

Although the above embodiments have been shown as apparatuses for transmitting the infrared remote control signal as the modulated signal, it is also possible to apply this invention to other forms of modulated signal which may be transmitted by wire or radio.

In summary, even when subjected to external noise, the modulated signal transmitting apparatus of the invention is able to transmit the modulated signals in stable condition without being interfered with by noise.

What is claimed is:

1. A modulated signal receiving and transmitting apparatus comprising:
   a receiving circuit for receiving from a distant transmitter a first modulated signal modulated by a first control signal;
   a filter coupled to said receiving circuit for passing only a carrier signal of said first modulated signal;
   a frequency-voltage conversion circuit coupled to said filter for outputting a DC voltage corresponding to a frequency of the carrier signal from the filter;
   a voltage-controlled filter for receiving said first modulated signal from said receiving circuit and for outputting a second modulated signal, said voltage-controlled filter having a pass band characteristics which is changed according to said DC voltage so that at least a fundamental component of said carrier signal of the first modulated signal can be passed therethrough; and
   a transmitting circuit for transmitting said second modulated signal to a controlled apparatus.

2. The modulated signal receiving and transmitting apparatus as claimed in claim 1, wherein said voltage-controlled filter passes a command signal component of said carrier signal of said first modulated signal therethrough, and prevents a fundamental component and harmonic components of said carrier signal of said first modulated signal which are affected by external noise from passing therethrough.

3. The modulated signal receiving and transmitting apparatus as claimed in claim 1, wherein said voltage-controlled filter comprises:
   voltage-controlled oscillation circuit for producing a new carrier signal at an oscillation frequency determined according to said DC voltage from said frequency-voltage conversion circuit;
   a demodulating circuit for demodulating said first modulated signal from said receiving circuit and for outputting a command signal included in said first control signal; and
   a modulating circuit for modulating said new carrier signal from said voltage-controlled oscillation circuit with said command signal as an output signal of said demodulating circuit to output a second modulated signal.

4. The modulated signal receiving and transmitting apparatus as claimed in claim 1, wherein said first modulated signal inputted to said receiving circuit and said second modulated signal outputted from said transmitting circuit are infrared signals.

5. The modulated signal receiving and transmitting apparatus as claimed in claim 1, wherein said first modulated signal inputted to said receiving circuit is transmitted from a remote controller in a room different from one in which said transmitting circuit is installed.

6. The modulated signal receiving and transmitting apparatus as claimed in claim 1, wherein said first modulated signal inputted to said receiving circuit is outputted from a transmitter through a wire, and said second signal modulated signal outputted from said transmitting circuit is transmitted through a wire.

7. A modulated signal receiving and transmitting apparatus comprising:
   a receiving circuit for receiving from a distant transmitter a first modulated signal modulated by a first control signal;
   a filter coupled to said receiving circuit for passing only a carrier signal of said first modulated signal;
   a frequency-voltage conversion circuit for outputting a DC voltage corresponding to a frequency of the carrier signal from the filter;
   a voltage-controlled oscillation circuit for producing a new carrier signal having an oscillation frequency determined according to said DC voltage from the frequency-voltage conversion circuit;
   a demodulating circuit for demodulating said first modulated signal from said receiving circuit and for outputting a command signal included in said first control signal;
   a modulating circuit for modulating said new carrier signal from said voltage-controlled oscillation circuit with said command signal as an output signal of said demodulating circuit to output a second modulated signal; and
   a transmitting circuit for transmitting said second modulated signal.

8. The modulated signal receiving and transmitting apparatus as claimed in claim 7, wherein said first modulated signal inputted to said receiving circuit and said second modulated signal outputted from said transmitting circuit are infrared signals.

9. The modulated signal receiving and transmitting apparatus as claimed in claim 7, wherein said first modulated signal inputted to said receiving circuit is transmitted from a remote controller in a room different from one in which said transmitting circuit is installed.

10. A modulated signal receiving and transmitting apparatus as claimed in claim 7, wherein said first modulated signal inputted to said receiving circuit is outputted from a transmitter through a wire, and said second signal modulated signal outputted from said transmitting circuit is transmitted through a wire.

* * * * *